(12) United States Patent
Neelappa (10) Patent No.: US 9,347,549 B2
(45) Date of Patent: May 24, 2016

(54) GEAR ENGAGEMENT MECHANISM

(71) Applicant: GM Global Technology Operations LLC, Detroit, MI (US)

(72) Inventor: Ganesha Neelappa, Chikkamaradi (IN)

(73) Assignee: GM Global Technology Operations, LLC, Detroit, MI (US)

( * ) Notice: Subject to any disclaimer, the term of this patent is extended or adjusted under 35 U.S.C. 154(b) by 443 days.

(21) Appl. No.: 13/847,774

(22) Filed: Mar. 20, 2013

(65) Prior Publication Data

US 2014/0283641 A1 Sep. 25, 2014

(51) Int. Cl.
| | |
|---|---|
| *B60K 20/00* | (2006.01) |
| *F16H 59/02* | (2006.01) |
| *F16H 59/04* | (2006.01) |
| *F16H 63/30* | (2006.01) |
| *F16H 63/38* | (2006.01) |

(52) U.S. Cl.
CPC .............. *F16H 59/04* (2013.01); *F16H 63/302* (2013.01); *F16H 63/38* (2013.01); *Y10T 74/20159* (2015.01); *Y10T 74/20177* (2015.01)

(58) Field of Classification Search
CPC .................. F16H 2063/3076; F16H 2063/325; F16H 59/04; F16H 59/041; F16H 2059/048
USPC ........ 74/335, 473.21–473.28, 473.36–473.37
See application file for complete search history.

(56) References Cited

U.S. PATENT DOCUMENTS

| | | | | |
|---|---|---|---|---|
| 4,294,338 A | * | 10/1981 | Simmons | 74/339 |
| 4,337,675 A | * | 7/1982 | Holdeman | 74/473.24 |
| 5,385,223 A | * | 1/1995 | Certeza | 192/219 |
| 5,445,253 A | * | 8/1995 | Reyes | 74/339 |
| 7,270,027 B2 | | 9/2007 | Berger et al. | |
| 7,654,170 B2 | | 2/2010 | Wittkopp | |
| 7,686,733 B2 | | 3/2010 | Hun | |
| 7,707,905 B2 | | 5/2010 | Haka | |
| 2011/0061487 A1 | | 3/2011 | Tooman et al. | |
| 2012/0137805 A1 | | 6/2012 | Oh et al. | |

FOREIGN PATENT DOCUMENTS

| | | | | |
|---|---|---|---|---|
| DE | WO 2005075856 A2 | * | 8/2005 | .............. F16H 63/20 |
| JP | WO 2012153830 A1 | * | 11/2012 | ............ F16H 63/302 |

OTHER PUBLICATIONS

English translation of WO2005075856A2.*
English translation of WO2012153830A1.*
Pictures taken of Hyundai Eon transmission outside of United States.
U.S. Appl. No. 13/847,780, filed Mar. 20, 2013, by Ganesha Neeiappa. All pages.

* cited by examiner

*Primary Examiner* — Ha D Ho (57) ABSTRACT

A shifting assembly for a vehicular transmission includes a shift rail having a yoke coupled thereto. A lever may be provided having portions forming an L-shaped slot. The yoke may engage the lever through the slot. The shift rail may be configured to shift the transmission into a forward gear ratio and a reverse gear ratio. The shift rail may be configured to translate along a primary axis in a first direction and in an opposite second direction. A shift fork may be coupled to the shift rail, which is configured to cause the transmission to shift into a forward gear ratio when the shift rail is translated in the first direction to a forward gear engagement position. The yoke may be configured to cause the transmission to shift into a reverse gear ratio when the shift rail is translated in the second direction to a reverse gear engagement position.

19 Claims, 10 Drawing Sheets

GEAR ENGAGEMENT MECHANISM

FIELD

The present disclosure relates to mechanisms used for shifting vehicular transmissions and more particularly to a lever and assembly for engaging a gear in a vehicular transmission.

BACKGROUND

The statements in this section merely provide background information related to the present disclosure and may or may not constitute prior art.

Gear changes in manual and dual clutch transmissions are generally achieved by clutches, such as synchronizer clutches, which are splined to and which rotate with an associated shaft. Adjacent to each clutch is one or a pair of gears which provide distinct gear or speed ratios. Each clutch is movable to couple the gear to the shaft and drive torque is then applied to the engaged gear or shaft.

For example, a shifter assembly engages a yoke that is coupled to a shift rail. When the shifter assembly moves the yoke, the shift rail and the attached clutches are moved, which engage a gear on one side of clutch. In some cases, the rail can be axially moved in an opposite direction by the yoke to engage the clutch with a second gear disposed on an opposite side of the clutch. Accordingly, each yoke is typically coupled to a dedicated rail, and one or two gears can be activated by the clutch on a particular rail.

In addition, to engage a reverse gear (or another gear), one of the yokes may engage a reverse lever that rotates about a pivot point. The reverse lever is operable to selective engage the reverse gear. A dedicated shift rail and yoke is used for the rotating reverse lever, which typically includes a coil spring and ball for detent actuation.

Because each shift rail occupies space in the transmission and requires mounting bosses and/or linear bearings, the shift rails add to the complexity and cost of a transmission. Reducing their number is thus desirable.

SUMMARY

The present disclosure provides a single shift rail for engaging two different gear ratios, such as a forward gear ratio and a reverse gear ratio. A reverse gear engagement lever may be provided which has portions forming an L-shaped slot through which a yoke coupled to the shift rail engages a reverse gear in one position while refraining from engaging the reverse gear in another position.

In one variation, a shifting assembly for a transmission of a motor vehicle is provided. The shifting assembly includes a shift rail for shifting the transmission into a plurality of gear ratios, a shifting yoke coupled to the shift rail, and a lever. The shifting yoke has a pin extending therefrom. The lever has portions forming an L-shaped slot therein. The pin of the shifting yoke engages the lever through the L-shaped slot.

In another variation, which may be combined with or separate from the other variations described therein, a shifting lever for a transmission of a motor vehicle is provided. The shifting lever includes a main body portion forming an L-shaped slot therein. The L-shaped slot is configured to be engaged by a pin of a shifting yoke. The shifting lever also has a rotating end portion configured to rotate about a pivot point. The rotating end portion is connected to the main body portion. Further, the shifting lever has a lever arm end configured to selectively engage a gear. The lever arm end is connected to the main body portion. The lever arm end is disengaged from the gear in a first position, and the lever arm end engages the gear in a second position.

In yet another variation, which may be combined with or separate from the other variations described therein, a shifting assembly for a transmission of a motor vehicle is provided. The shifting assembly includes a shift rail for shifting the transmission into a forward gear ratio and a reverse gear ratio. The shift rail defines a primary axis along a length of the shift rail, and the shift rail is configured to translate along the primary axis in a first direction and a second direction, wherein the first direction is opposite the second direction. A shift fork is coupled to the shift rail. The shift fork is configured to cause the transmission to shift into a forward gear ratio when the shift rail is translated in the first direction to a forward gear engagement position. A shifting yoke is also coupled to the shift rail. The shifting yoke is configured to cause the transmission to shift into a reverse gear ratio when the shift rail is translated in the second direction to a reverse gear engagement position.

Further advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
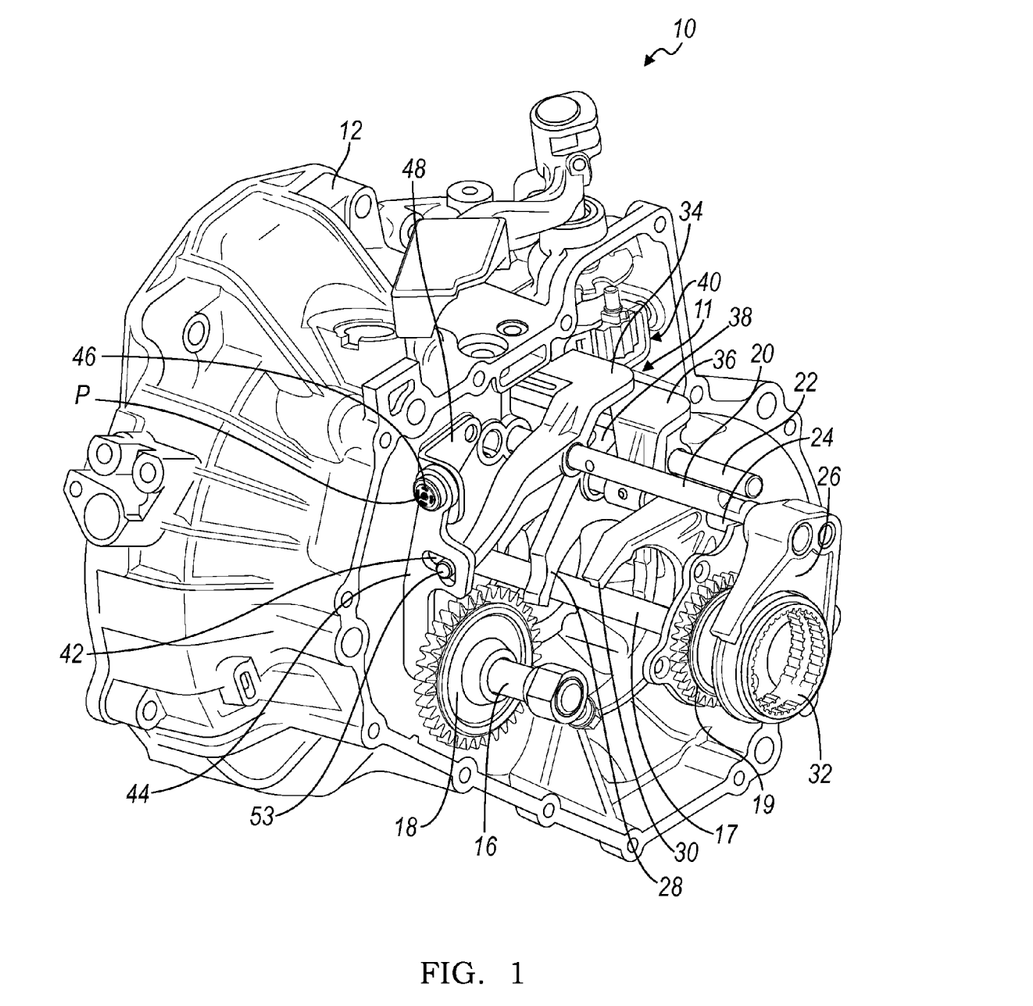
FIG. 1 is a perspective view in partial section of a portion of a transmission incorporating a shifting assembly and a cantilever detent assembly according to the principles of the present disclosure.

With reference now to FIG. 1, a portion of a vehicular transmission is illustrated and generally designated by the reference number 10. By way of example, the transmission 10 may be either a manual transmission, a dual clutch transmission (DCT) or other configuration wherein synchronizers and face or dog clutches are utilized to connect a plurality of gears to one or more associated shafts. The transmission 10 includes an exterior housing 12 which typically includes openings, counterbores, shoulders, flanges and the like which locate, receive and retain various components of the transmission 10.

The transmission 10 includes a shifting assembly 11. Supported for rotation within the housing 12 on, for example, bearing surfaces or assemblies, are various shafts, one of which, a countershaft or layshaft 16, is illustrated. The countershaft 16 is coupled to a reverse idler gear 18. A fifth gear shaft 17 is provided having a fifth gear 19 disposed thereon. In other embodiments, the fifth gear shaft 17 could be used for a forward gear other than fifth gear, however. Other shafts may include a fifth gear and reverse gear shift rail 20 (which could alternatively be another forward gear combined with the reverse gear shift rail), a first/second gear shift rail 22, and a third/fourth gear shift rail 24. Each shift rail 20, 22, 24 has at least one shift fork 26, 28, 30 coupled to the shift rail for activating an adjacent gear (not shown). The shift forks 26, 28, 30 each have a clutch 32 (other clutches not shown) disposed thereon for coupling the shift fork 26, 28, 30 to a gear. For example, the fifth/reverse shift rail 20 is coupled to a first shift fork 26, which is coupled to a clutch 32. The clutch 32 is configured to engage the fifth gear 19. As should be understood, however, the fifth gear 19 could alternatively be another forward gear.

Each shift rail 20, 22, 24 also has a shift yoke 34, 36, 38 coupled to the shift rail 20, 22, 24 for axially moving the shift rail 20, 22, 24. For example, the fifth/reverse shift rail 20 has a fifth/reverse yoke 34 coupled to the fifth/reverse shift rail 20. A shifter assembly 40 is operable to axially translate the fifth/reverse shift yoke 34, which axially translates the shift rail 20, the fifth/reverse yoke 34, and the fifth gear clutch 32.

In FIG. 1, the fifth/reverses shift rail 20 is illustrated in a neutral position without either of the fifth gear 19 or the reverse idler gear 18 being engaged. However, when the shift rail 20 is axially translated to the left to a fifth gear (or forward gear) engagement position (in the orientation of FIG. 1), the fifth gear 19 will be engaged. As the fifth/reverse yoke 34 is axially translated, it slides within an L-shaped slot 42 formed in a reverse gear engaging lever 44. When the shift rail 20 is translated to the right (in the orientation of FIG. 1), the fifth/reverse yoke 34 causes the reverse gear engaging lever 44 to rotate about a pivot point P and engage the reverse idler gear 18, which will be described in further detail below.

The reverse gear engaging lever 44 is part of a cantilever detent assembly 46, which allows the reverse gear engaging lever 44 to rotate with respect to a bracket 48 attached to the transmission housing 12 when the reverse idler 18 is being engaged. However, the cantilever detent assembly 46 exerts a positive hold on the reverse gear engaging lever 44 in a position that is stationary with respect to the transmission housing 12, and substantially vertical in the orientation of FIG. 1, when fifth gear 19 is being engaged, which will be described in further detail below.

Figure 2:
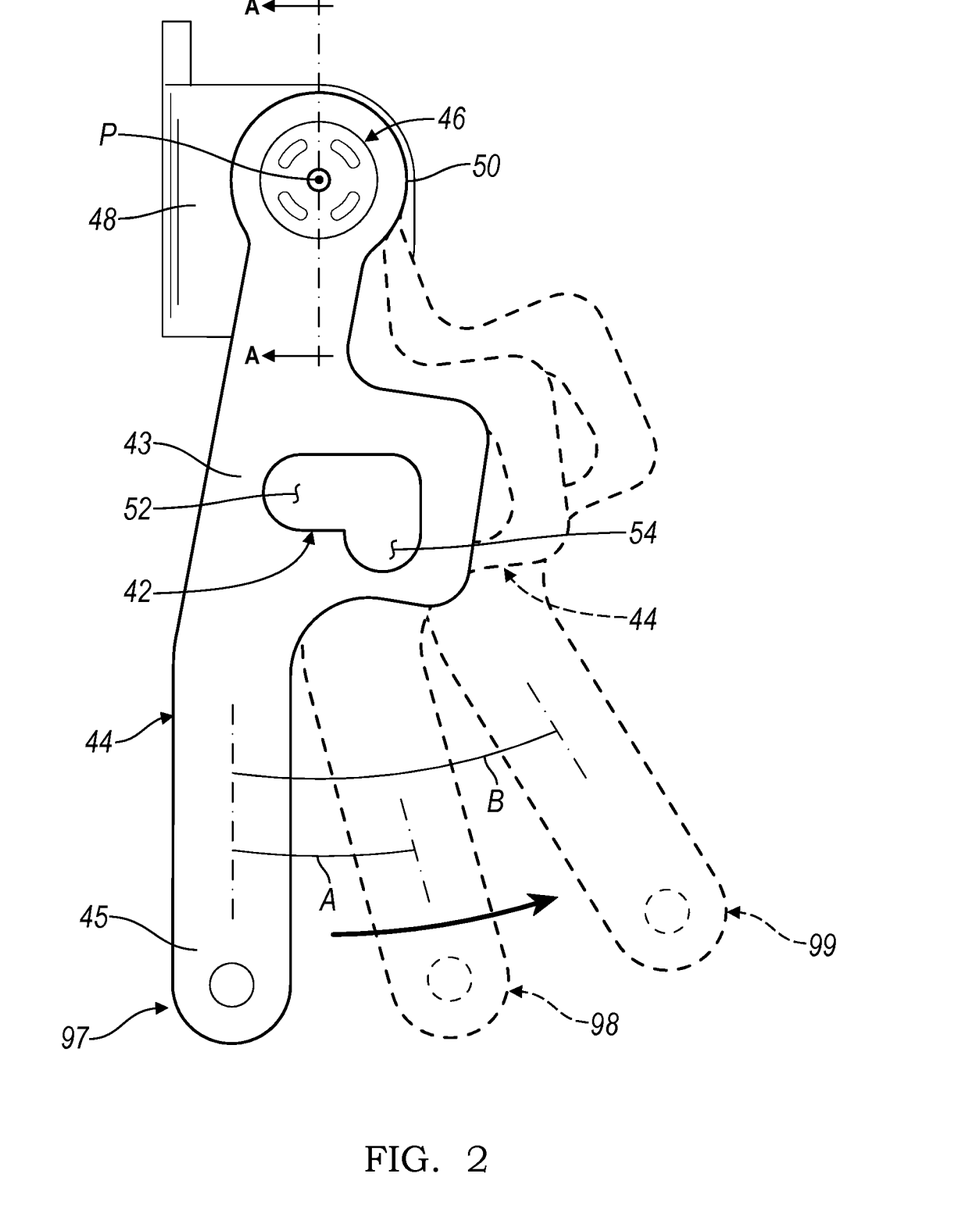
FIG. 2 is a front view of a portion of the cantilever detent assembly and the shifting assembly shown in FIG. 1, in accordance with the principles of the present disclosure.

Referring now to FIGS. 2, 3A, 3B, 4A, 4B, 5A, 5B, 6A, and 6B, additional details of the reverse gear engaging lever 44 and the cantilever detent assembly 46 are illustrated. Referring to FIG. 2, the reverse gear engaging lever 44 is illustrated. The reverse gear engaging lever has a main body portion 43 forming the L-shaped slot 42 therein. A round, rotating end portion 50 of the reverse gear engaging lever 44 is assembled with and part of the cantilever detent assembly 46. The rotating end portion 50 is connected to the main body portion 43. The reverse gear engaging lever 44, including the rotating end portion 50, is configured to rotate about the pivot point P located in the center of the round portion 50 of the reverse gear engaging lever 44. A lever arm 45 is connected to the main body portion 43. The lever arm 45 is configured to selectively engage the reverse idler gear 18. More specifically, the lever arm 45 engages the reverse idler gear 18 when the reverse gear engagement lever 44 and the cantilever detent assembly 46 are in the third position 99 illustrated in FIGS. 6A-6B below (as well as FIG. 2). The lever arm 45 is disengaged from the reverse idler gear 18, however, when the reverse gear engaging lever 44 and the cantilever detent assembly 46 are disposed in the first position 97, explained below and shown in FIGS. 4A-4B (as well as FIG. 2).

The reverse gear engaging lever 44 has portions forming the L-shaped slot 42 in the main body portion 43. The L-shaped slot 42 has a long portion 52, or first channel, that allows a pin 53 of the fifth/reverse yoke (see FIG. 1) to move in a horizontal direction in the long portion 52 of the slot 42 (in the orientation of FIG. 2) when the shift rail 20 is engaging and disengaging from the fifth gear 19. The L-shaped slot 42 has a short portion 54, or second channel, which is in communication with the long portion 52 and oriented perpendicular to the long portion 52. When the pin 53 of the fifth/reverse yoke 34 is disposed in the short portion 54 of the L-shaped slot 42, the pin 53 causes the reverse gear engaging lever 44 to rotate about the pivot point P.

Figure 3A:
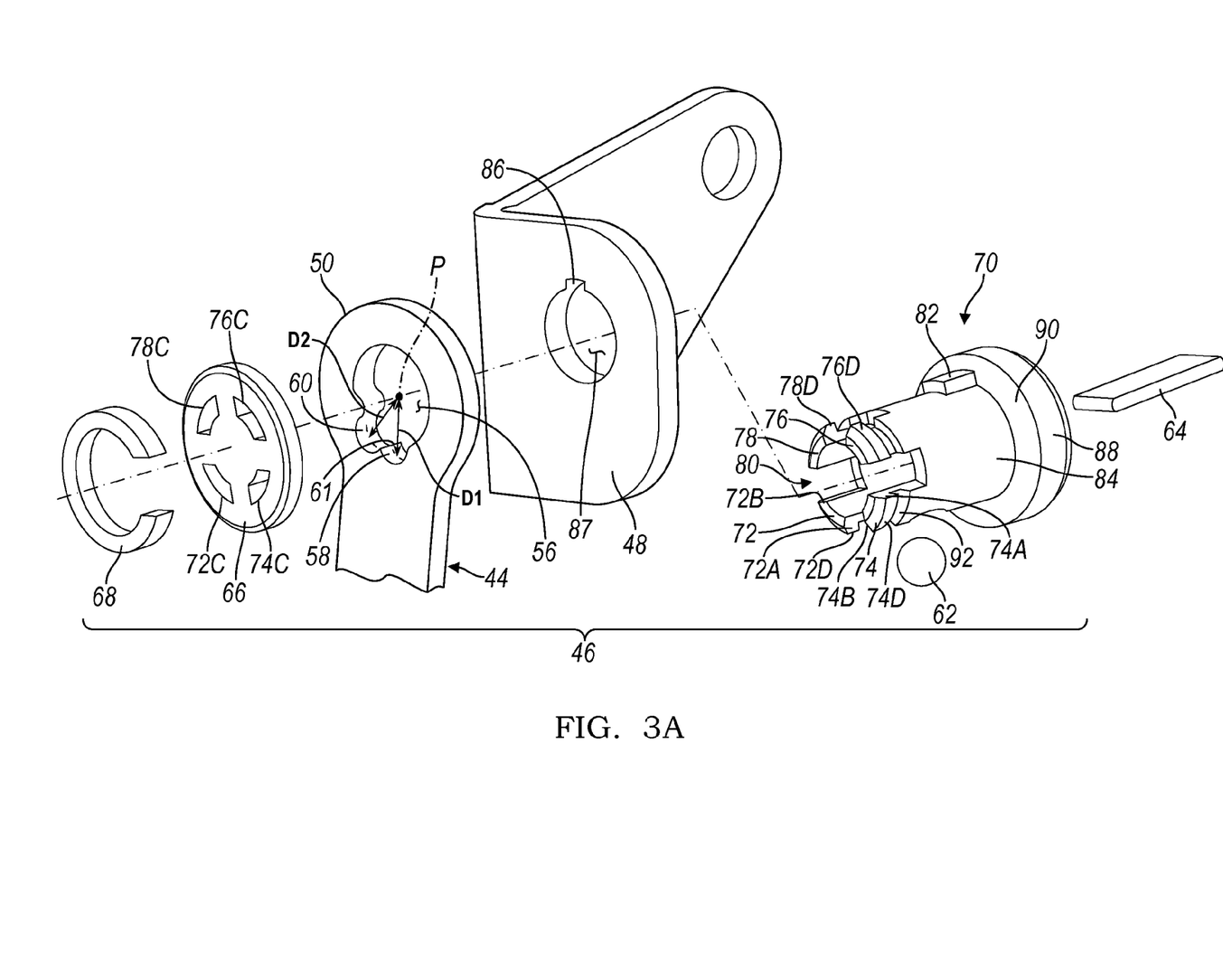
FIG. 3A is an exploded perspective view of the cantilever detent assembly partially shown in FIGS. 1-2, according to the principles of the present disclosure.
Figure 3B:
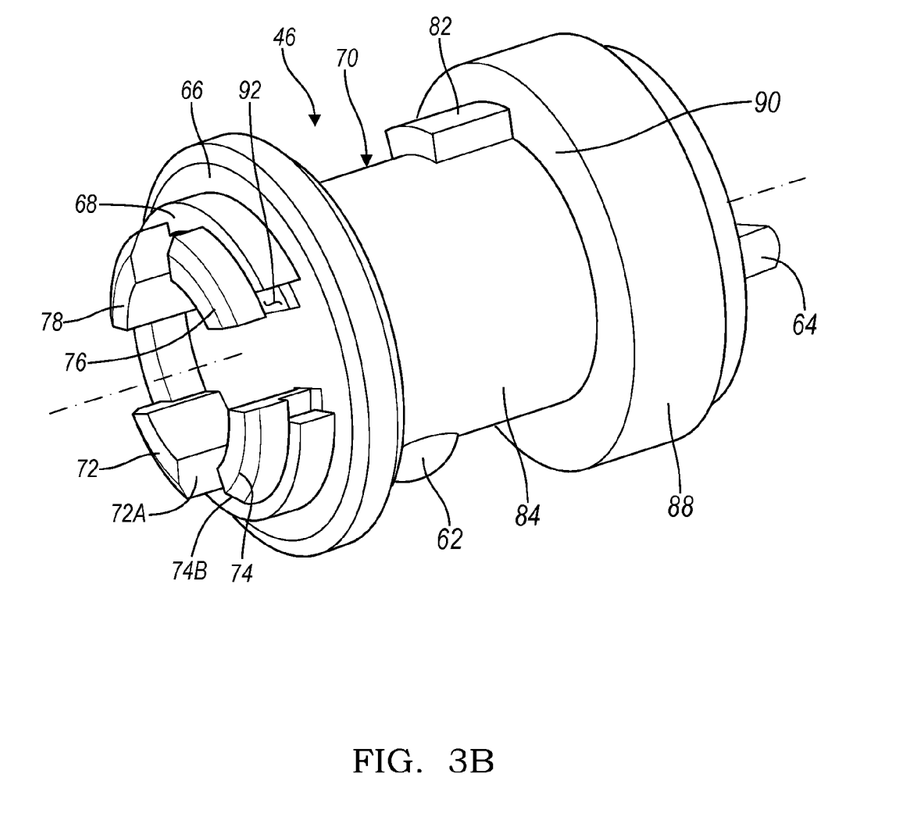
FIG. 3B is an assembled perspective view of a portion of the cantilever detent assembly of FIGS. 1-3A, in accordance with the principles of the present disclosure.

Referring to FIGS. 3A-3B, an exploded view and an assembled view of the cantilever detent assembly 46 is illustrated, though the reverse gear engaging lever 44 and the bracket 48 are omitted from the assembly view in FIG. 3B. As can be seen in FIG. 3A, the reverse gear engaging lever 44 defines an opening 56 therein. Thus, the reverse gear engaging lever 44 has portions forming the opening 56. A first groove 58 and a second groove 60 are formed in the reverse gear engaging lever 44, at the edge of the opening 56. A raised portion 61 of the reverse gear engaging lever 44 protrudes into the opening 56 and separates the first and second grooves 58, 60. The detent assembly 46 also has a ball 62, a spring plate 64, a side plate 66, and a retainer ring 68.

In addition, the cantilever detent assembly 46 has a generally cylindrical detent housing 70. The detent housing 70 has four legs 72, 74, 76, 78 extending from an end 80 thereof. Each leg 72, 74, 76, 78 defines opposing retainer wall surfaces. For example, the first leg 72 defines a first retainer wall surface 72A and a second retainer wall surface 72B. Likewise, the second leg 74 defines a first retainer wall surface 74A and a second retainer wall surface 74B.

When the cantilever detent assembly 46 is assembled, the detent housing 70 is fixedly connected to the bracket 48, the side plate 66, the retainer ring 68, the spring plate 64, and the transmission housing 12. The detent housing 70 has a projection 82 extending from its cylindrical outer wall 84, and the projection mates with an indentation 86 formed in the bracket 48. The detent housing 70 has a cylindrical end hub 88 that is disposed adjacent to the cylindrical outer wall 84, and the cylindrical end hub 88 has a greater outer diameter than the outer diameter of the cylindrical outer wall 84 of the detent housing 70. Thus, the end hub 88 has a horizontal surface 90 that is disposed in contact with the bracket 48 when the cantilever detent assembly 46 is assembled. The outer wall 84 extends through an aperture 87 in the bracket and the opening 56 of the reverse gear engaging lever 44 when the cantilever detent assembly 46 is assembled. The portions of the reverse gear engaging lever 44 forming the opening 56 in the reverse gear engaging lever 44 are disposed around the outer wall 84 of the detent housing 70.

In addition, when the cantilever detent assembly 46 is assembled, the legs 72, 74, 76, 78 are each disposed through a mating hole 72C, 74C, 76C, 78C formed through the side plate 66. The retainer ring 68 is disposed in an indentation 92 formed in the outer wall 84 of the detent housing 70. A lip 72D, 74D, 76D, 78D formed on each of the legs 72, 74, 76, 78 locks each leg 72, 74, 76, 78 to the retainer ring 68.

In addition, when the cantilever detent assembly 46 is assembled, the ball 62 is disposed adjacent to a pair of the retainer walls. In the embodiment illustrated in FIGS. 3A and 3B, the ball 62 is disposed adjacent to the first retainer wall 72A of the first leg 72 of the detent housing 70, and the ball 62 is disposed adjacent to the second retainer wall 74B of the second leg 74 of the detent housing 70. The spring plate 64, which is fixedly attached to the detent housing 70 is disposed adjacent to the ball 62. Thus, the retainer walls 72A, 72B cooperate with the spring plate 64, the reverse gear engaging lever 44, and the side plate 66 (which is held to the detent housing 70 by the retainer ring 68) to hold the ball 62 at least partially within the detent housing 70.

Figure 4A:
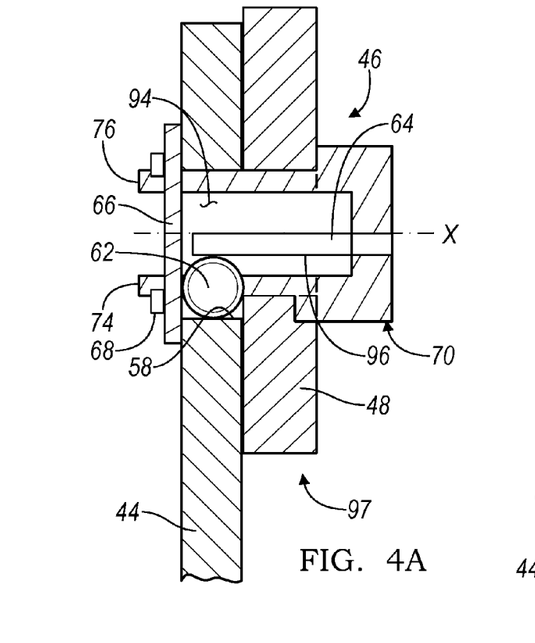
FIG. 4A is a side cross-sectional view of the cantilever detent assembly of FIGS. 1-3B in a first position, taken along the line A-A of FIG. 2, according to the principles of the present disclosure.
Figure 4B:
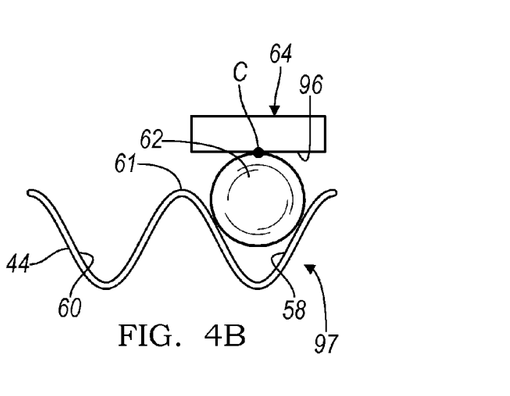
FIG. 4B is a schematic view of a portion of the cantilever detent assembly of FIGS. 1-4A in the first position, in accordance with the principles of the present disclosure.
Figure 5A:
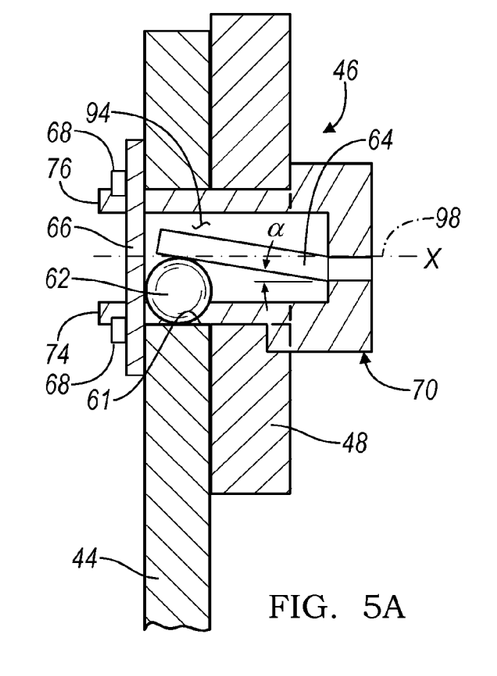
FIG. 5A is a side cross-sectional view of the cantilever detent assembly of FIGS. 1-4B in a second position, taken along the line A-A of FIG. 2, according to the principles of the present disclosure.

Referring now to FIGS. 4A-4B and 5A-5B, the motion of the cantilever detent assembly 46 will be described in further detail. As can be seen in FIGS. 4A and 5A, the spring plate 64 extends into a central cavity 94 formed in the detent housing 70. In FIGS. 4A-4B, the ball 62 is disposed in the first groove 58 of the reverse gear engaging lever 44. A wall 96 of the spring plate 64 biases the ball 62 into the first groove 58 of the reverse gear engaging lever 44, and the spring plate 64 is disposed in a horizontally flat orientation (in the orientation of FIG. 4A). In other words, the spring plate 64 is parallel to or collinear with a central axis X of the detent housing 70. When the ball 62 is biased into the first groove 58, the lever is in a neutral position or in fifth gear, and the reverse gear engaging lever 44 is in a first position 97. As shown in solid lines in FIG. 2 in the first position 97 (also, the first position 97 is shown in FIGS. 4A-4B), the reverse gear engaging lever 44 is in a vertical position. The reverse gear engaging lever 44, however, is configured to rotate with respect to the detent housing 70, the bracket 48 and the spring plate 64. Thus, the portions of the reverse gear engaging lever 44 forming the opening 56 rotate around the outer wall 84 of the detent housing 70.

Figure 4C:
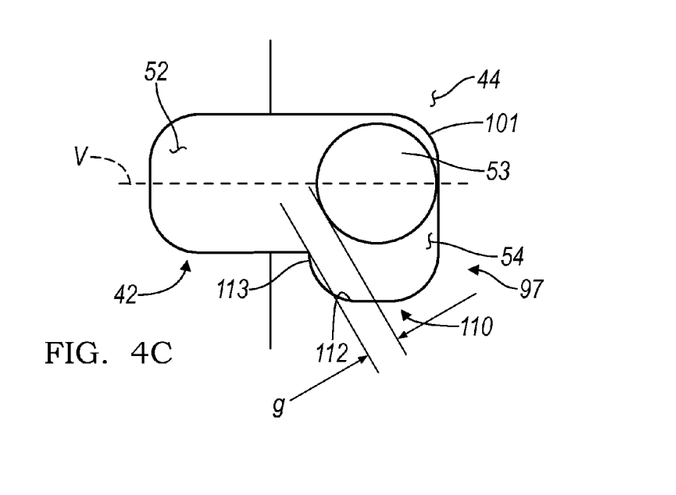
FIG. 4C is a schematic of a portion of the shifting assembly of FIG. 1 including a portion of the cantilever detent assembly of FIGS. 1-4B in the first position, according to the principles of the present disclosure.

FIG. 4C illustrates the position of the lever 44 with respect to the pin 53 in close-up detail, when the lever 44 is in the first position 97.

Figure 5B:
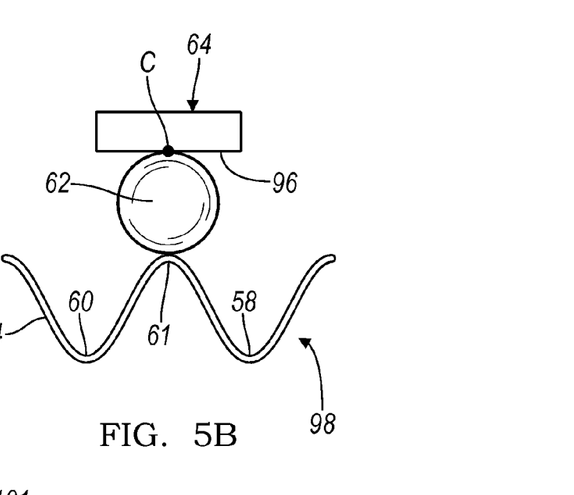
FIG. 5B is a schematic view of a portion of the cantilever detent assembly of FIGS. 1-5A in the second position, in accordance with the principles of the present disclosure.

Referring now to FIGS. 5A-5B, the reverse gear engaging lever 44 is rotated into a second position 98 (also shown in dashed lines in FIG. 2). In the second position 98, the reverse gear engaging lever 44 has been rotated about the pivot point P, around the detent housing 70. Accordingly, the raised portion 61 of the reverse gear engaging lever 44 is moved so that it is disposed under the ball 62, and the ball 62 is disposed directly between the raised portion 61 and the center C of the wall 96 of the spring plate 64. In the second position 98, the ball 62 is no longer seated in the first groove 58, nor is the ball 62 seated in the second groove 60. Moving the reverse gear engaging lever 44 so that the ball 62 is disposed atop the raised portion 61 in the second position 98 forces spring plate 64 upward and out of the horizontally flat orientation, so the spring plate 64 extends in an acute angle α from horizontal (in the orientation of FIG. 5A). In other words, the spring plate 64 extends at an angle α from the central axis X of the detent housing 70. For example, the spring plate 64 extends at an angle α between 5 and 45 degrees from the central axis X of the detent housing 70. In FIGS. 5A-5B, the reverse gear engaging lever 44 has been rotated about the detent housing 70 from the first position 97 to the second position 98. The ball 62 has remained along the plane A-A, but has translated in an upward direction (in the orientation of FIG. 2) along the plane A-A within the opening 56 of the reverse gear engaging lever 44.

Figure 5C:
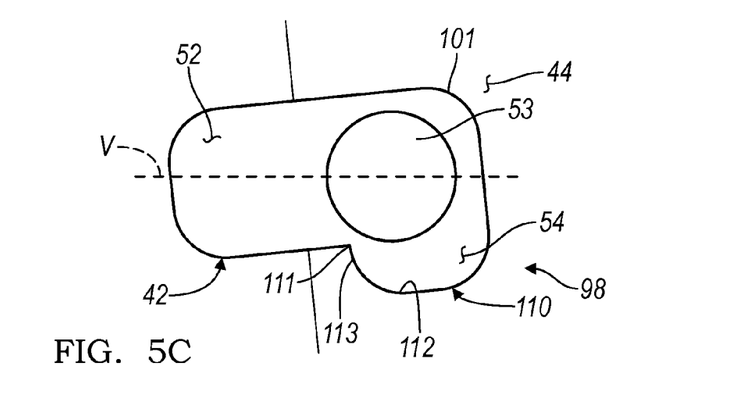
FIG. 5C is a schematic of a portion of the shifting assembly of FIG. 1 including a portion of the cantilever detent assembly of FIGS. 1-5B in the second position, according to the principles of the present disclosure.

FIG. 5C illustrates the position of the lever 44 with respect to the pin 53 in close-up detail, when the lever 44 is in the second position 98.

The reverse gear engaging lever 44 may then be rotated further from the first position 97 into a third position 99, shown in dashed lines in FIG. 2. The third position 99 is rotated further from the first position 97 than the second position 98. In the third position, the reverse gear engaging lever 44 has been rotated about the pivot point P, around the detent housing 70 a greater radial distance from the first position 97 than the second position 98. In other words, the reverse gear engaging lever 44 is turned a first radial distance A from the first position 97 to the second position, and the reverse gear engaging lever 44 is turned a second radial distance B from the first position 97 to the third position 99 (through the second position 98), where the second radial distance B is greater than the first radial distance A.

Figure 6A:
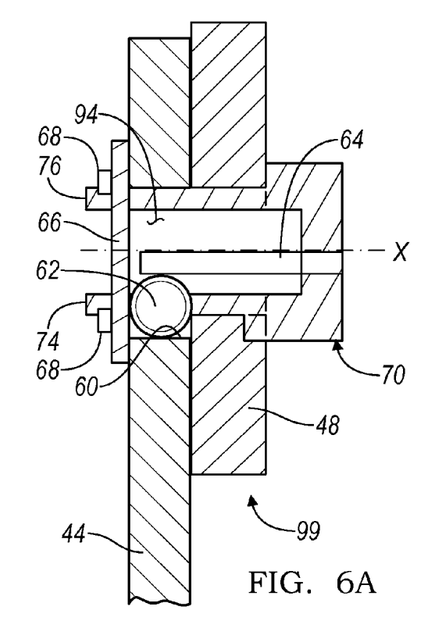
FIG. 6A is a side cross-sectional view of the cantilever detent assembly of FIGS. 1-5B in a third position, taken along the line A-A of FIG. 2, according to the principles of the present disclosure.
Figure 6B:
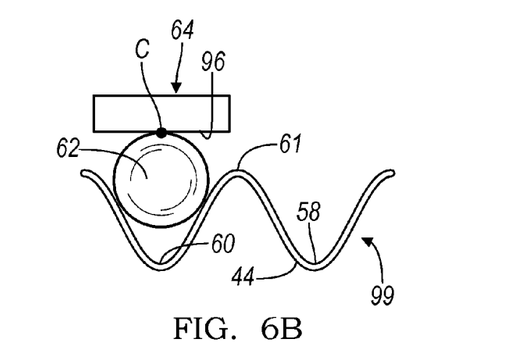
FIG. 6B is a schematic view of a portion of the cantilever detent assembly of FIGS. 1-6A in the third position, in accordance with the principles of the present disclosure.

Accordingly, going from the first position 97 to the third position 99, the reverse gear engaging lever 44 is rotated first so that the raised portion 61 of the reverse gear engaging lever 44 is disposed under the ball 62, and the ball 62 is disposed directly between the raised portion 61 and the center C of the wall 96 of the spring plate 64 (as shown in FIGS. 5A-5B), and then the reverse gear engaging lever 44 is rotated further into the third position 99 so that the ball 62 is disposed, or seated, in the second groove 60, as shown in FIGS. 6A-6B. In the third position 99, the ball 62 is no longer seated in the first groove 58, nor is the ball 62 located atop the raised portion 61; instead, the ball 62 is seated in the second groove 60 in the third position 99. Moving the reverse gear engaging lever 44 so that the ball 62 is seated in the second groove 60 in the third position 99 allows the spring plate 64 to come back down from its location in the second position 98, so that the spring plate 64 is again in a horizontally flat orientation as shown in FIG. 6A. In other words, the spring plate 64 is parallel to or collinear with a central axis X of the detent housing 70. The spring plate 64 biases the ball 62 into the second groove 60 in the third position 99. In FIGS. 6A-6B, the reverse gear engaging lever 44 has been rotated about the detent housing 70 from the first position 97, through the second position 98, to the third position 99. The ball has remained along the plane A-A, but has translated in an upward direction (in the orientation of FIG. 2) along the plane A-A, and then in a downward direction along the plane A-A, within the opening 56 of the reverse gear engaging lever 44.

Figure 6C:
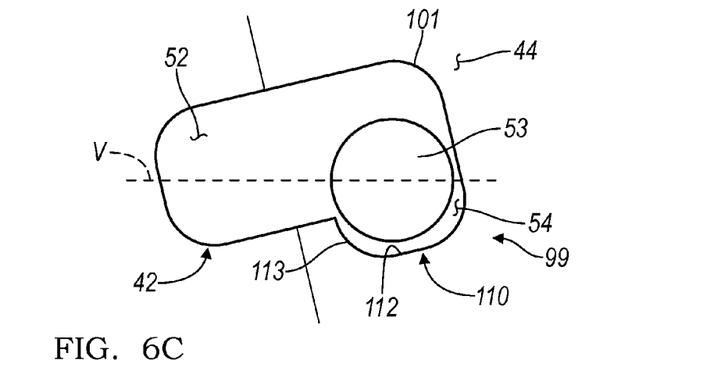
FIG. 6C is a schematic of a portion of the shifting assembly of FIG. 1 including a portion of the cantilever detent assembly of FIGS. 1-6B in the third position, according to the principles of the present disclosure.

Referring now to FIG. 6C, the pin 53 is illustrated in the slot 42 in the reverse gear engaging position 99, at a distal end 110 of the second channel 54, adjacent to an end face 112. To move from the reverse gear speed to a neutral position (or the forward gear), the pin 53 must be moved into a neutral position at the intersection of the first and second channels at the corner 101 of the L-shaped slot 42. However, upon attempting to translate the pin 53 along a horizontal axis V, as the shift rail 20 and yoke 34 move along parallel horizontal axes, the pin 53 exerts pressure on a side surface 113 of the second channel 54, without immediately translating into the neutral corner 101.

Referring to FIGS. 4B and 5B, the lever 44 then exerts enough force on the ball 62 and spring plate 64 to move the raised portion 61 of the lever 44 under the ball 62 and spring plate 64, and into the second position 98 illustrated in FIGS. 5A-5B. Referring to FIG. 5C, the lever 44 then moves with respect to the pin 53, such that the pin 53 is then located at a position nearly at the intersection of the first and second channels 52, 54, adjacent to the inner corner 111 of the L-shaped slot 42. The pin 53 always remains disposed along the horizontal axis V, but the pin 53 may translate along the axis V.

After moving to the second position 98, the lever 44 moves further back toward the first position 97, so that the ball 62 seats in the first groove 58 in the first position 97 (as in FIGS. 3A-3B). Referring to FIG. 4C, as the ball 62 is seated in the first groove 58, the lever 44 is moved further with respect to the pin 53 from the position of FIG. 5C to the neutral position at the wherein the pin 53 is located at the corner 101 of the lever 44, wherein the first and second channels 52, 54 meet. Accordingly, the cantilever detent assembly 46, including the lever 44 having first and second grooves 58, 60, assists the pin 53 in returning to the neutral position after engaging the reverse gear 18, because the lever 44 is translated with respect to the pin 53, moving the surface 113 away from the pin 53, such that the pin 53 rests in the corner 101 located a distance g from the surface 113 of the lever 44.

Thus, the reverse gear engaging lever 44 is rotated about the pivot point P, and the first groove 58 is located a first distance D1 from the pivot point P, while the second groove 60 is located a second distance D2 from the pivot point P. The first and second distances D1, D2 may be equal in magnitude, but they are not oriented along the same plane from the pivot point P. In other words, the planes disposed along the first and second distances D1, D2 intersect at the pivot point P and are not coplanar. In addition, the grooves 58, 60 are not located at the same point as the pivot point P; instead, each of the grooves are located a distance D1, D2 away from the pivot point P.

The ball 62 is, therefore, configured to selectively seat in the first groove 58, and the ball 62 is further configured to selectively seat in the second groove 60, as the reverse gear engaging lever 44 is rotated around the detent housing 70 and the pivot point P. The spring plate 64 is configured to selectively bias the ball 62 into the first groove 58, and the spring plate 64 is further configured to selectively bias the ball 62 into the second groove 60. The reverse gear engaging lever 44 is moveable with respect to the ball 62 to seat the ball 62 in the first and second grooves 58, 60. Therefore, the cantilever detent assembly 46 selectively engages the reverse idler gear 18 when the reverse gear engaging lever 44 is rotated. The reverse idler gear 18 is disengaged when the reverse gear engaging lever 44 is in the first position 97, and the reverse idler gear 18 is engaged when the reverse gear engaging lever 44 is in the third position 99.

Figure 7A:
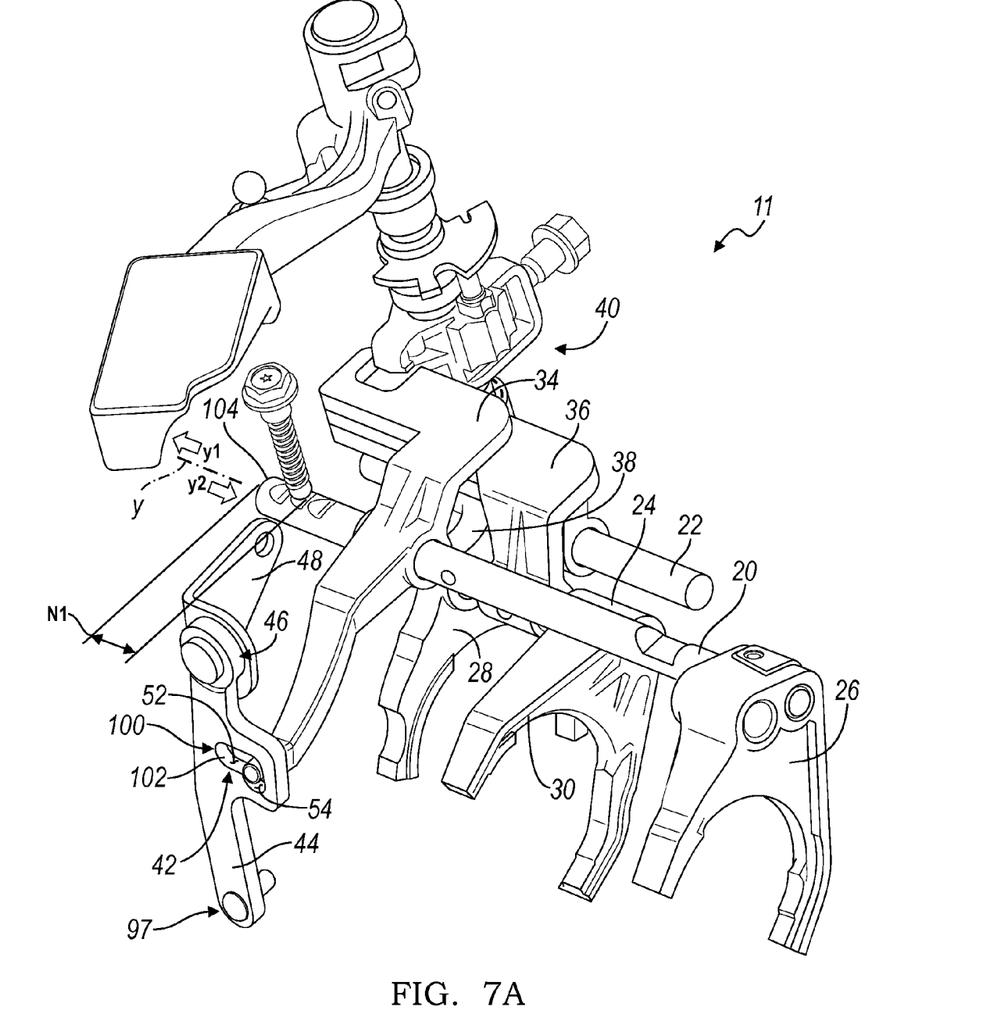
FIG. 7A is a perspective view of the shifting assembly shown in FIG. 1 and partially in FIG. 2, showing the first shift rail and reverse gear engaging lever in a neutral position, according to the principles of the present disclosure.

Referring now to FIG. 7A, the shifting assembly 11 is illustrated in a neutral position, as shown in FIG. 1 and partially in FIGS. 2 (solid lines), 4A and 4B, with neither the reverse idler gear 18 nor the forward gear 19, which causes the transmission to operate in a fifth forward gear speed ratio in this embodiment, engaged. In the neutral position, the reverse gear engaging lever 44 is disposed in the first position 97 (substantially vertical), described above with respect to FIGS. 2, 4A, and 4B.

In the neutral position, the pin 53 is disposed in the L-shaped slot 42 at a position where the first and second channels 52, 54 meeting, in the corner 101 of the "L" shape.

The first shift rail 20 defines a primary axis Y along the length of the first shift rail 20. The first shift rail 20 is configured to translate in a first direction Y1 along the primary axis Y and in an opposite second direction Y2 along the primary axis Y. In the neutral position, the shift rail 20 is located in a neutral axial position, which is illustrated as being a distance N1 from a shift detent screw 49 that is fixed to the transmission case 12 shown in FIG. 1, measured from an end 104 of the shift rail 20 along a line parallel to the primary axis Y. In other words, N1 is measured along an axis parallel to the primary axis Y, from the end 104 of the shift rail 20 to a plane extending vertically through the shift detent screw 49.

The forward gear 19 for establishing a fifth forward gear speed ratio is not illustrated in FIG. 7A, but it should be understand that the gear 19 would be located at a distance from the shift fork 26 and not being engaged by the first shift fork 26 when the shift rail 20 is in the neutral position of the first shift rail 20.

Figure 7B:
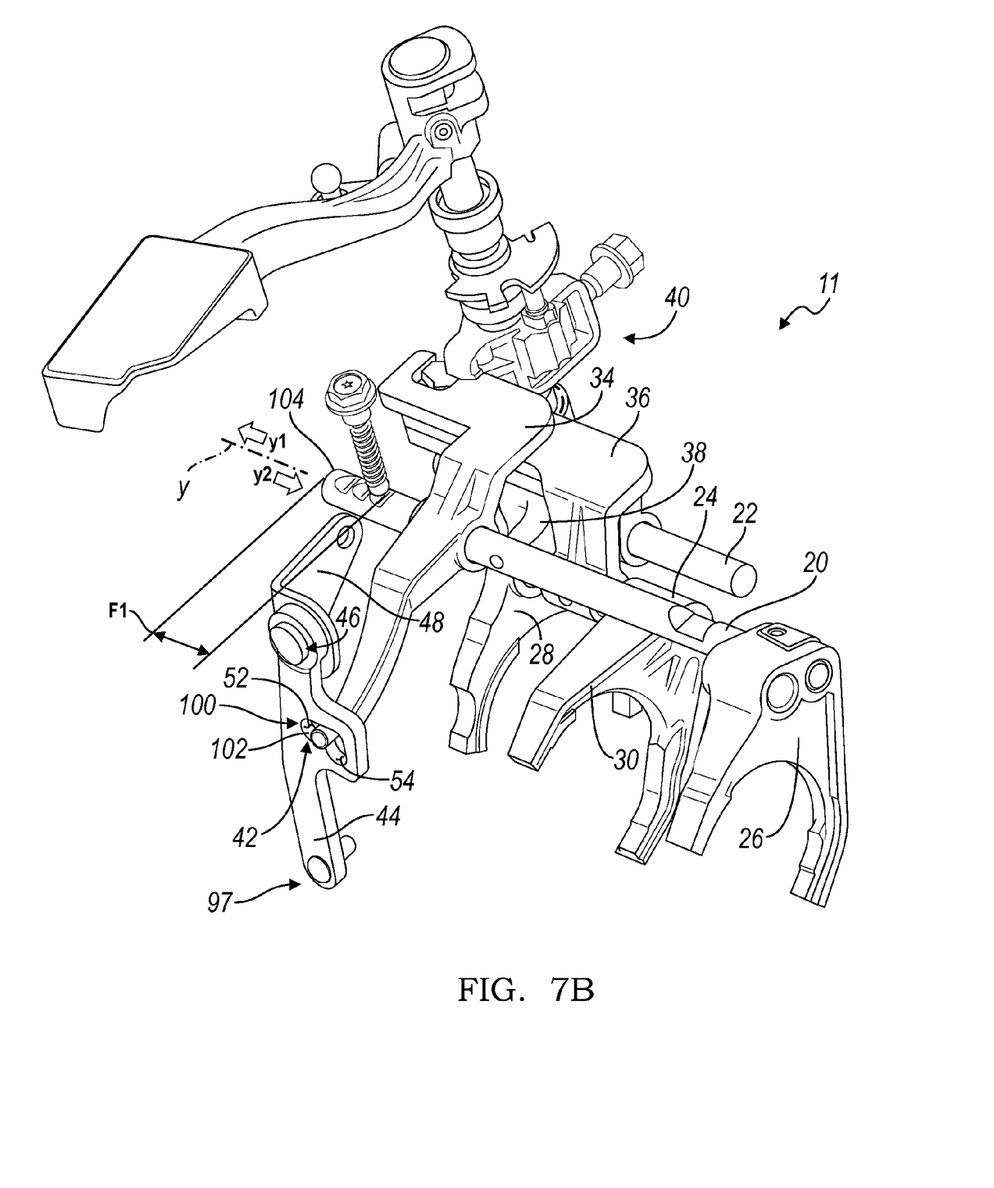
FIG. 7B is a perspective view of the shifting assembly of FIG. 7A, showing the first shift rail and reverse gear engaging lever in a forward gear engagement position, in accordance with the principles of the present disclosure.

Referring to FIG. 7B, the shifting assembly 11 is illustrated in a forward gear engagement position, wherein the forward gear 19 (shown in FIG. 1) for the fifth forward gear is engaged. However, as stated previously, the forward gear 19 could alternatively be used for engaging another forward gear speed, other than fifth gear, if desired.

In the forward gear engagement position, the pin 53 of the first yoke 34 is disposed in the first channel 52 of the L-shaped slot 42 of the reverse gear engaging lever 44. In the forward gear engagement position, the pin 53 has been slid from the neutral position in the L-shaped slot 42, where the first and second channels 52, 54 meet, to a proximal end 100 of the first channel 52 and adjacent to an end face 102 of the first channel 52.

In FIG. 7B, the shift rail 20 has been translated along the primary axis Y in the first direction Y1 to the forward gear engagement position. In the forward gear engagement position, the end 104 of the shift rail 20 is disposed a distance F1 from the plane extending vertically through the shift detent screw 49, measured along a line parallel to the primary axis Y. As the shift rail 20 translates along the primary axis, the first shifting yoke 34 also translates along a straight line parallel to or collinear with the primary axis Y, in first and second directions that are parallel to or collinear with the first and second directions Y1, Y2.

The forward gear 19 for establishing a fifth forward gear speed ratio is not illustrated in FIG. 7B, but it should be understand that the gear 19 would be located in contact with the first shift fork 26 (or an extension thereof, such as clutch 32) and would be engaged by the first shift fork 26 when the shift rail 20 is in the forward gear engagement position. Thus, the first shift fork 26 is configured to cause the transmission 10 to shift into a forward (fifth) gear speed ratio when the shift rail 20 is translated in the first direction Y1 to the forward gear engagement position.

In the forward gear engagement position, the reverse gear engaging lever 44 remains in the vertical position, the first position 97, illustrated in FIGS. 2, 4A, and 4B. The reverse gear engaging lever 44 remains stationary when the pin 53 is sliding or disposed in the first channel 52. Accordingly, the reverse gear 18 is disengaged when the forward gear 19 is engaged. Thus, the shifting assembly 11 is configured to shift the transmission 10 into the fifth forward gear speed ratio when the pin 53 of the yoke 34 is disposed at the proximal end 100 of the first channel 52, adjacent to an end face 102 of the first channel 52. It should be understood, however, that the forward gear 19 could be engaged when the pin 53 is located anywhere in the first channel 52 away from the corner 101, if desired, and the pin 53 does not necessarily need to be located adjacent to the end face 102 to engage the forward gear 19 to establish a forward gear ratio.

Figure 7C:
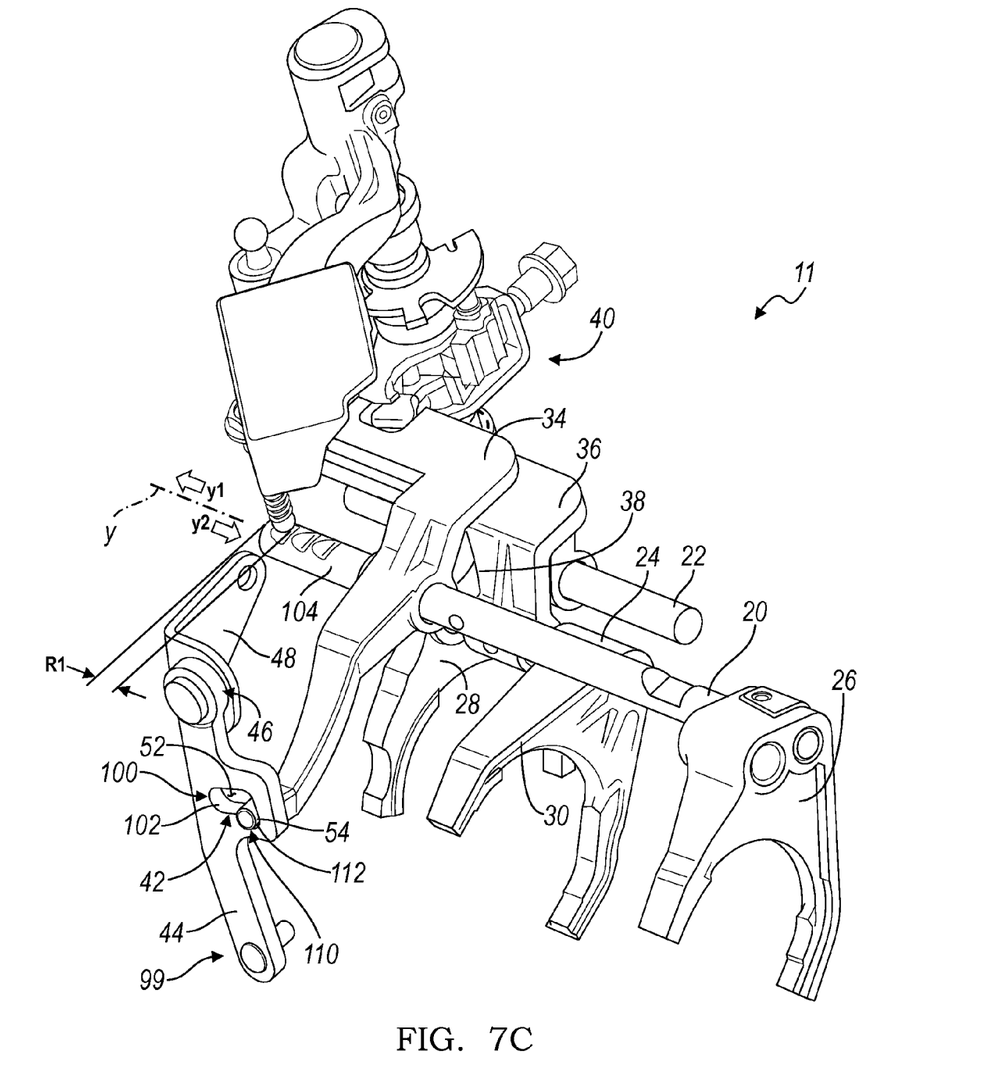
FIG. 7C is a perspective view of the shifting assembly of FIGS. 7A-7B, showing the first shift rail and reverse gear engaging lever in a reverse gear engagement position, according to the principles of the present disclosure.

Referring to FIG. 7C, the shifting assembly 11 is illustrated in a reverse gear engagement position, wherein the reverse idler gear 18 (shown in FIG. 1) is engaged, such that the transmission 10 operates in a reverse gear ratio.

In the reverse gear engagement position, the pin 53 of the first yoke 34 is disposed in the second channel 54 of the L-shaped slot 42 of the reverse gear engaging lever 44. In the reverse gear engagement position, the pin 53 has been slid from the neutral position in the L-shaped slot 42, where the first and second channels 52, 54 meet at the corner 101, to a distal end 110 of the second channel 54 and adjacent to an end face 112 of the second channel 54. The pin 53 may have previously been located in the first channel 52, for example, in the forward gear engagement position explained above.

In FIG. 7C, the shift rail 20 has been translated along the primary axis Y in the second direction Y2 to the reverse gear engagement position. In the reverse gear engagement position, the end 104 of the shift rail 20 is disposed a distance R1 from the plane extending vertically through the shift detent screw 49, measured along a line parallel to the primary axis Y.

The forward gear 19 for establishing a fifth forward gear speed ratio is not illustrated in FIG. 7C, but it should be understand that the gear 19 would be located at a distance from the first shift fork 26 (or an extension thereof, such as clutch 32) and would not be engaged by the first shift fork 26 when the shift rail 20 is in the reverse gear engagement position. Accordingly, the forward gear 19 is disengaged when the reverse gear 18 is engaged. As illustrated in FIGS. 7A-7C, F1>N1>R1, and therefore, the first shift fork 26 is farther away from the fifth gear wheel 19 (see FIG. 1) in the reverse gear engagement position than in the neutral position of the first shift rail 20.

In the reverse gear engagement position, the reverse gear engaging lever 44 is rotated about the pivot point P as explained above to the third position 99, illustrated in FIGS. 2, 6A, and 6B. The reverse gear engaging lever 44 rotates when the pin 53 is sliding or disposed in the second channel 54 away from the intersection of the first and second channels 52, 54. The shifting assembly 11 is configured to shift the transmission 10 into the reverse gear speed ratio when the pin 53 of the yoke 34 is disposed at the distal end 110 of the second channel 54, adjacent to the end face 112 of the second channel 54. It should be understood, however, that reverse gear engaging lever 44 could be rotated, and the reverse gear ratio engaged, when the pin 53 is located anywhere in the second channel 54 away from the neutral position at the corner 101, if desired.

When the shifting assembly 11 is in the reverse gear engagement position, an extension 114 of the reverse gear engaging lever 44 is configured to engage the reverse gear 18.

It will be appreciated that the location and particular embodiments of the shift rails 20, 22, 24 and yokes 34, 36, 38 could have various other configurations without departing from the spirit and scope of the present disclosure. In addition, the particular embodiments of the cantilever detent assembly 46 illustrated in the figures could have variations within the spirit and scope of the claims. The description of the invention is merely exemplary in nature and variations that do not depart from the gist of the invention are intended to be within the scope of the invention. Such variations are not to be regarded as a departure from the spirit and scope of the invention.

What is claimed is:

1. A shifting assembly for a transmission of a motor vehicle, the shifting assembly comprising:
   a shift rail for shifting the transmission into a plurality of gear ratios;
   a shifting yoke coupled to the shift rail, the shifting yoke having a pin extending therefrom;
   a lever having portions forming an L-shaped slot therein, the pin of the shifting yoke engaging the lever through the L-shaped slot, the lever configured to rotate about a pivot point;
   a detent mechanism having a detent housing with a housing longitudinal axis disposed co-axially on an axis extending through the pivot point, the lever being configured to rotate around the pivot point and the detent housing.

2. The shifting assembly of claim 1, wherein the L-shaped slot has a first channel in communication with a second channel, the second channel being oriented perpendicular to the first channel, the pin being configured to selectively engage the lever in the first channel, the pin being configured to selectively engage the lever in the second channel, the shifting assembly being configured to shift the transmission into a first gear ratio when the pin is disposed in the first channel and to shift the transmission into a second gear ratio when the pin is disposed in the second channel.

3. The shifting assembly of claim 2, wherein the first gear ratio is a forward speed ratio and the second gear ratio is a reverse speed ratio.

4. The shifting assembly of claim 3, wherein the lever is configured to remain stationary when the pin is disposed in the first channel, the lever being configured to rotate about the pivot point when the pin is disposed in the second channel at a point away from a neutral intersection of the first and second channels, the lever having an extension that is configured to engage a reverse gear when the pin is disposed in a reverse gear engagement position in the second channel.

5. The shifting assembly of claim 4, wherein the lever has a first groove and a second groove formed therein, the shifting assembly further comprising a ball configured to selectively seat in the first groove, the ball being further configured to selectively seat in the second groove.

6. The shifting assembly of claim 5, further comprising a plate configured to selectively bias the ball into the first groove, the plate being further configured to selectively bias the ball into the second groove.

7. The shifting assembly of claim 6, further comprising a first shaft having a forward gear disposed thereon and a second shaft having the reverse gear disposed thereon, the shifting assembly being configured to engage the forward gear when the pin is disposed in the first channel, the reverse gear being disengaged when the pin is disposed in the first channel, and the forward gear being disengaged when the pin is disposed in the second channel at a point away from a neutral intersection of the first and second channels, the pin being configured to slide in the first channel, the lever being configured to remain stationary when the pin is slid in the first channel, the pin being further configured to slide in the second channel.

8. The shifting assembly of claim 7, wherein the shift rail is configured to translate along a straight line in first and second directions, the first direction being opposite the second direction, wherein the shifting assembly is configured to engage the forward gear when the shift rail is translated in the first direction to a forward gear engagement position, the shifting assembly being configured to engage the reverse gear when the shift rail is translated in the second direction to a reverse gear engagement position.

9. A shifting lever for a transmission of a motor vehicle, the shifting lever comprising:
  a main body portion forming an L-shaped slot therein, the L-shaped slot being configured to be engaged by a pin of a shifting yoke;
  a rotating end portion configured to rotate about a pivot point, the rotating end portion being connected to the main body portion;
  a lever arm end configured to selectively engage a gear, the lever arm end being connected to the main body portion, wherein the lever arm end is disengaged from the gear in a first position, and the lever arm end engages the gear in a second position; and
  a detent mechanism having a detent housing with a housing longitudinal axis disposed coaxially on an axis extending through the pivot point, the shifting lever configured to rotate around the pivot point and the detent housing.

10. The shifting lever of claim 9, wherein the L-shaped slot has a first channel in communication with a second channel, the second channel being oriented perpendicular to the first channel, the pin being configured to selectively engage the lever in the first channel, the pin being further configured to selectively engaged the lever in the second channel, the lever being configured to shift the transmission into a first gear ratio when the pin is disposed in the first channel at a first gear ratio engagement position and to shift the transmission into a second gear ratio when the pin is disposed in the second channel at a second gear ratio engagement position, the lever being configured to remain stationary when the pin is disposed in the first channel, the lever being configured to rotate about the pivot point when the pin is disposed in the second channel at a point away from a neutral intersection of the first and second channels.

11. The shifting lever of claim 10, wherein the first gear ratio is a forward speed ratio and the second gear ratio is a reverse speed ratio.

12. The shifting lever of claim 11, wherein the detent mechanism further comprises:
  a ball positioned in either a first groove of the lever arm with the lever arm having an extension that is configured to engage a forward gear or positioned in a second groove of the lever arm with the extension of the lever arm engaging a reverse gear.

13. A shifting assembly for a transmission of a motor vehicle, the shifting assembly comprising:
  a shift rail for shifting the transmission into a forward gear ratio and a reverse gear ratio, the shift rail defining a primary axis along a length of the shift rail, the shift rail being configured to translate along the primary axis in a first direction and a second direction, the first direction being opposite the second direction;
  a shift fork coupled to the shift rail, the shift fork configured to cause the transmission to shift into a forward gear ratio when the shift rail is translated in the first direction to a forward gear engagement position; and
  a shifting yoke coupled to the shift rail, the shifting yoke configured to cause the transmission to shift into a reverse gear ratio when the shift rail is translated in the second direction to a reverse gear engagement position;
  a reverse gear engagement lever rotatable about a pivot point, and receiving a pin of the shifting yoke; and
  a detent mechanism having a detent housing with a housing longitudinal axis disposed coaxially on an axis extending through the pivot point, the shifting lever configured to rotate around the pivot point and the detent housing.

14. The shifting assembly of claim 13, wherein the shifting yoke is configured to engage the reverse gear engagement lever and cause the reverse gear engagement lever to rotate about the pivot point when the shift rail is translated to a reverse gear engagement position.

15. The shifting assembly of claim 14, wherein the lever has a first groove and a second groove formed therein separated from the first groove by a raised portion, the shifting assembly further comprising a ball configured to seat in the first groove in a first rotated position of the lever, the ball being further configured to seat in the second groove in a second rotated position of the lever after displacement over the raised portion, the shifting assembly further comprising a plate configured to bias the ball into each of the first groove and the second groove.

16. The shifting assembly of claim 15, further comprising a clutch disposed on the shift fork, the clutch configured to engage a forward gear and cause the forward gear to rotate when the shift rail is translated to the forward gear engagement position.

17. The shifting assembly of claim 16, wherein the reverse gear engagement lever has portions forming an L-shaped slot therein, the L-shaped slot having a first channel in communication with a second channel, the second channel being oriented perpendicular to the first channel, the shifting yoke having the pin configured to slide in the first channel and in the second channel, the shifting assembly being configured to shift the transmission into the forward gear ratio when the pin is disposed in the first channel and to shift the transmission into the reverse gear ratio when the pin is disposed in the second channel at a point away from a neutral intersection of the first and second channels.

18. The shifting assembly of claim 17, wherein the lever is configured to remain stationary when the pin is disposed in the first channel, the lever being configured to rotate about the pivot point when the pin is disposed in the second channel at a point away from the neutral intersection of the first and second channels.

19. The shifting assembly of claim 18, the clutch being configured to engage the forward gear when the pin is disposed in the first channel at the forward gear engagement position, the reverse gear being disengaged when the pin is disposed in the first channel, and the forward gear being disengaged when the pin is disposed in the second channel.

* * * * *